US010181053B2

(12) United States Patent
Stoop et al.

(10) Patent No.: US 10,181,053 B2
(45) Date of Patent: *Jan. 15, 2019

(54) SYSTEMS AND METHODS FOR MULTIPLE PHOTO FEED STORIES

(71) Applicant: Facebook, Inc., Menlo Park, CA (US)

(72) Inventors: Dirk John Stoop, Menlo Park, CA (US); Jorn Martinus Johannes van Dijk, Amsterdam (NL); Lin He, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,180

(22) Filed: May 27, 2016

(65) Prior Publication Data

US 2016/0275312 A1    Sep. 22, 2016

Related U.S. Application Data

(63) Continuation of application No. 13/591,512, filed on Aug. 22, 2012, now Pat. No. 9,378,393, which is a
(Continued)

(51) Int. Cl.
*G06F 7/04* (2006.01)
*G06F 21/62* (2013.01)

(52) U.S. Cl.
CPC ................. *G06F 21/6263* (2013.01)

(58) Field of Classification Search
None
See application file for complete search history.

(56) References Cited

U.S. PATENT DOCUMENTS

| 8,522,137 B1 * | 8/2013 | Brown | G06F 17/21 715/234 |
| 8,826,150 B1 * | 9/2014 | Ainslie | H04L 65/403 715/753 |

(Continued)

FOREIGN PATENT DOCUMENTS

| CN | 102077554 | 5/2011 |
| CN | 102253952 | 11/2011 |

(Continued)

OTHER PUBLICATIONS

Japanese Office Action with English translation citing three (3) references, dated Oct. 5, 2016.
(Continued)

*Primary Examiner* — Brandon S Hoffman
(74) *Attorney, Agent, or Firm* — Baker Botts L.L.P.

(57) ABSTRACT

Techniques to allow for ease of navigation within a photo browsing interface of a social networking system. In one embodiment, a designation of a first image for sharing is received from within at least one of a single-image view and a camera view. Based on the designation, the first image is added to a communication. The designation may be based on a user selection of an option provided by an interface of a mobile device. The first image may be received from within a social networking application or from within a dedicated camera application. In another embodiment, the privacy level of the communication and the designated images is based on the privacy setting of a user. The communication and the designated images may contain tag data identifying one or more people on a social networking system. In an alternative embodiment, the privacy level of the communication and designated images is adjusted according to the one or more people identified in the tag data.

24 Claims, 13 Drawing Sheets

Related U.S. Application Data continuation-in-part of application No. 13/565,594, filed on Aug. 2, 2012, now Pat. No. 9,246,958.

(56) References Cited

U.S. PATENT DOCUMENTS

| | | | |
|---|---|---|---|
| 9,626,381 B2* | 4/2017 | De Armas | G06F 3/0481 |
| 2008/0091723 A1 | 4/2008 | Zuckerberg | |
| 2009/0327885 A1 | 12/2009 | Aoki | |
| 2010/0146443 A1 | 6/2010 | Zuckerberg | |
| 2010/0299391 A1 | 11/2010 | Demarta | |
| 2012/0030586 A1 | 2/2012 | Ketkar | |
| 2012/0109836 A1 | 5/2012 | Chen | |
| 2013/0089243 A1* | 4/2013 | Sauve | G06F 17/30038 382/118 |

FOREIGN PATENT DOCUMENTS

| | | |
|---|---|---|
| JP | 2002278990 A | 9/2002 |
| JP | 2005-063519 | 3/2005 |
| JP | 2011-128775 | 6/2011 |
| WO | 2010/024991 | 3/2010 |
| WO | WO 2010/147828 A1 | 12/2010 |

OTHER PUBLICATIONS

Korean Office Action with English translation citing three (3) references, dated Oct. 10, 2016.

Notification of the Second Office Action for Chinese Patent Application 2013800550537, dated Nov. 6, 2017.

Examination Report No. 1 for AU Patent Application No. 2017204290, dated Apr. 18, 2018.

Notification of the First Office Action for CN Application No. 2013800550537, dated Apr. 6, 2017.

JP OA received from JPO for Patent Application No. 2017-127323. (with English Translation), Aug. 1, 2018.

CN OA received for Patent Application No. 2013800550537 (with English Translation), Jul. 25, 2018.

* cited by examiner

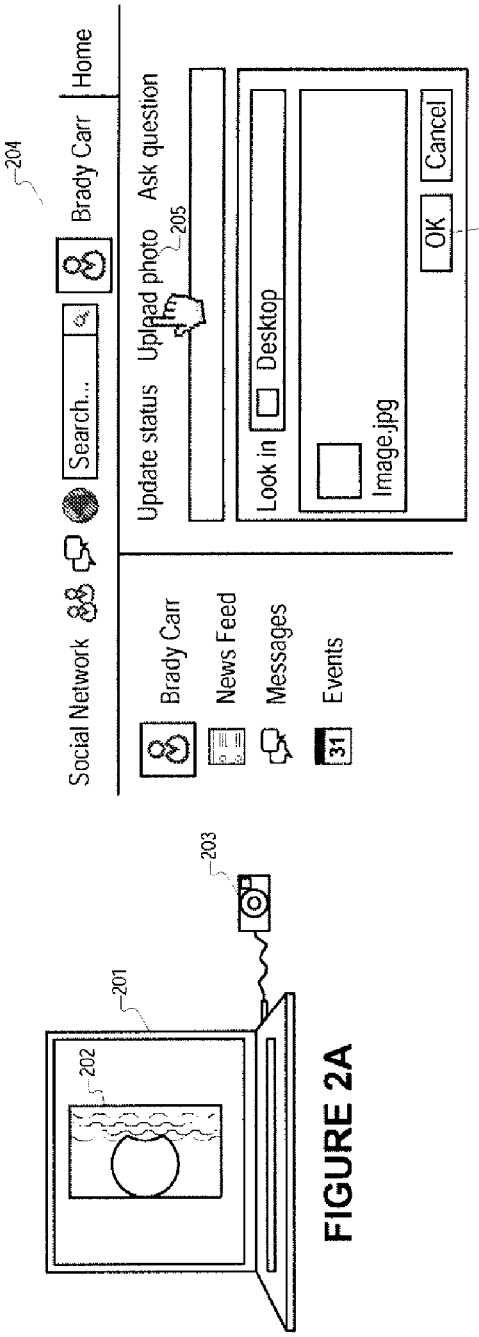
FIGURE 2A
FIGURE 2B
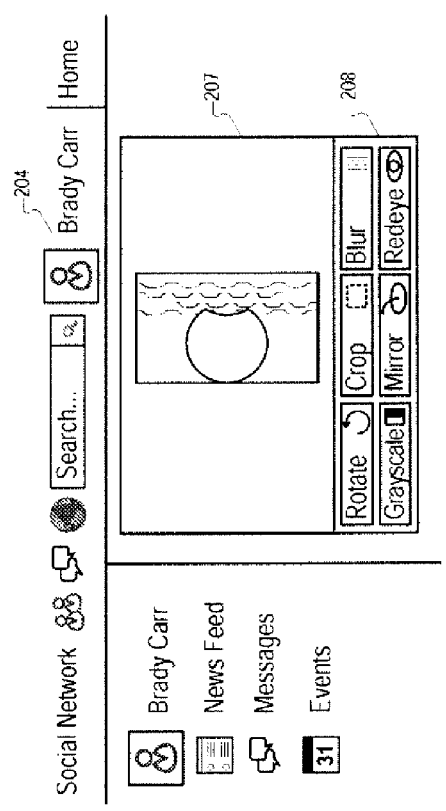
FIGURE 2C

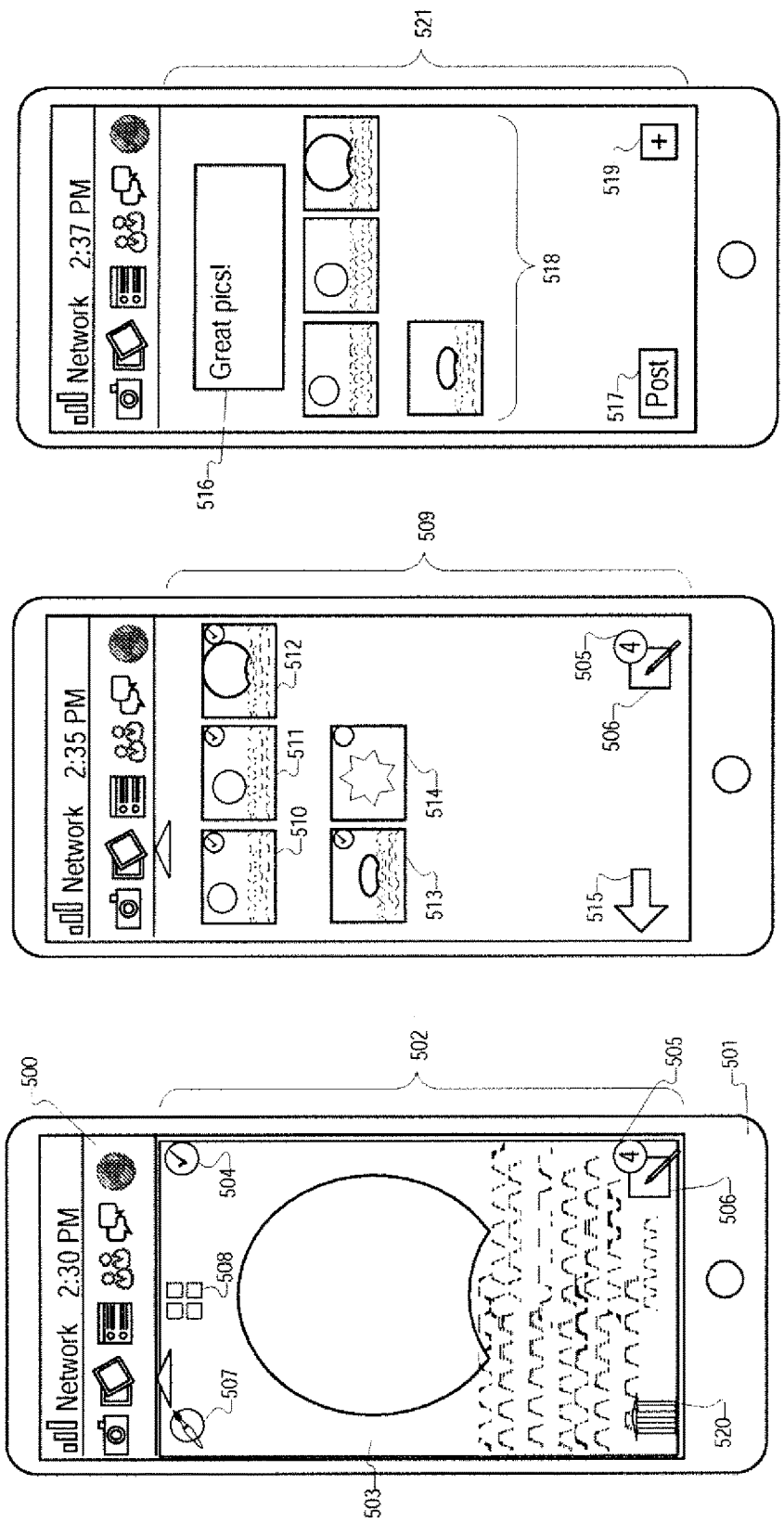

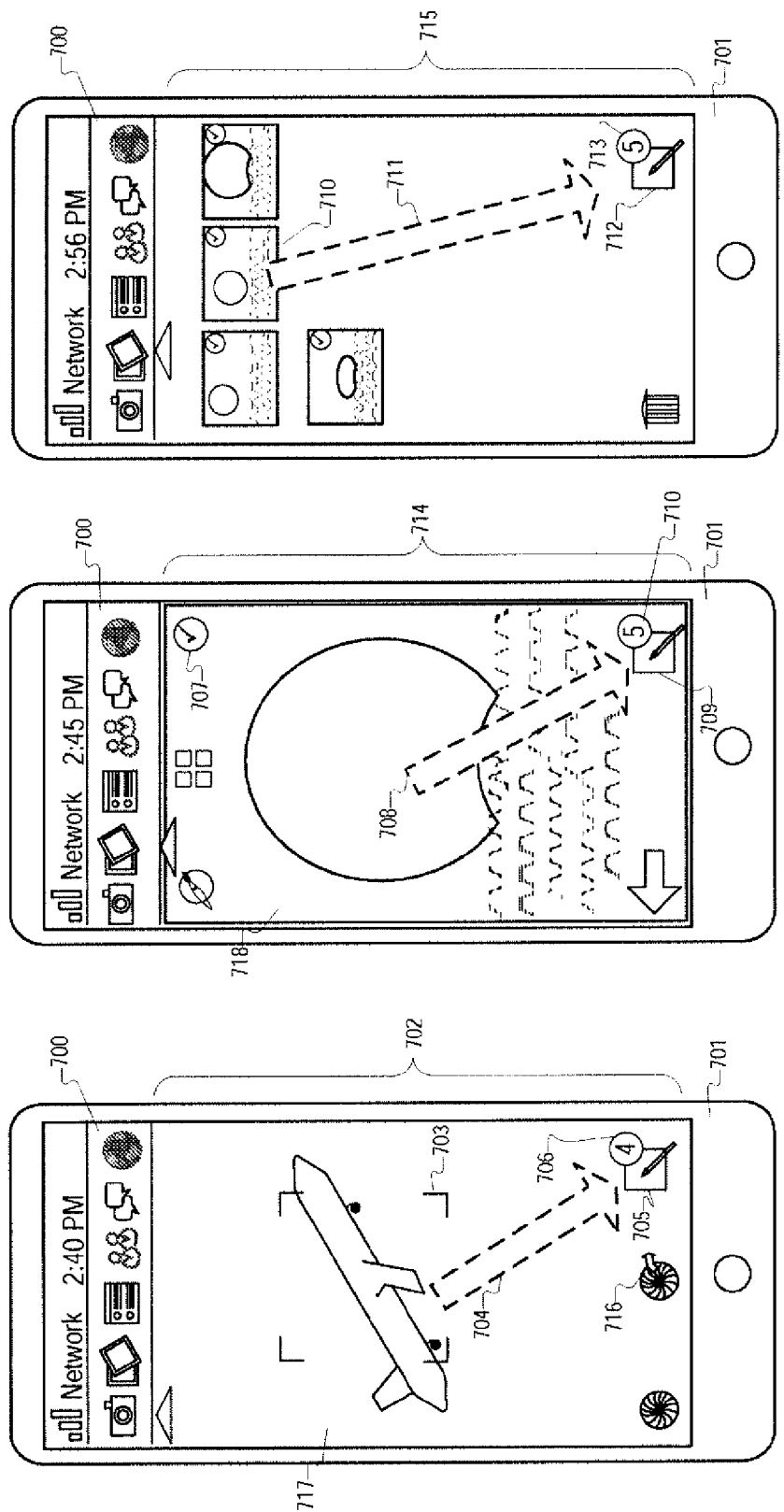

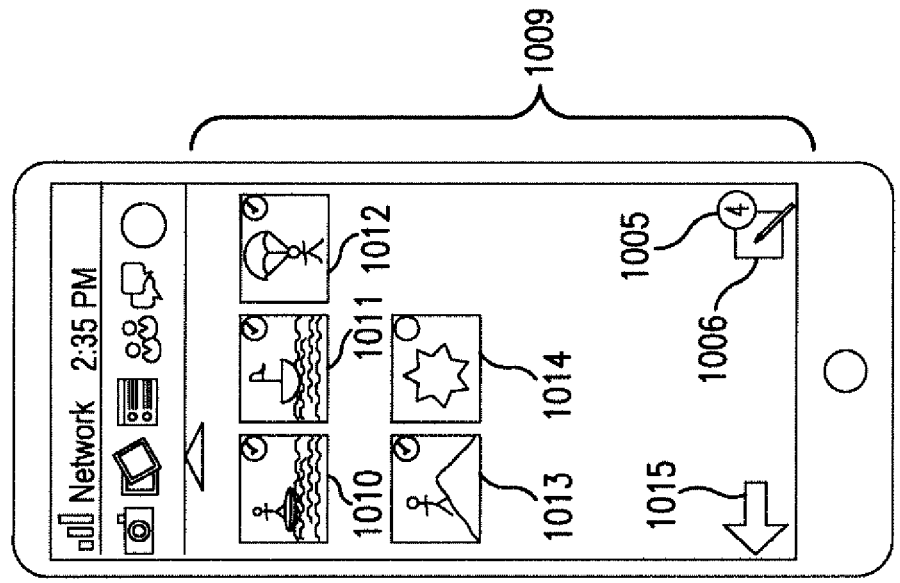
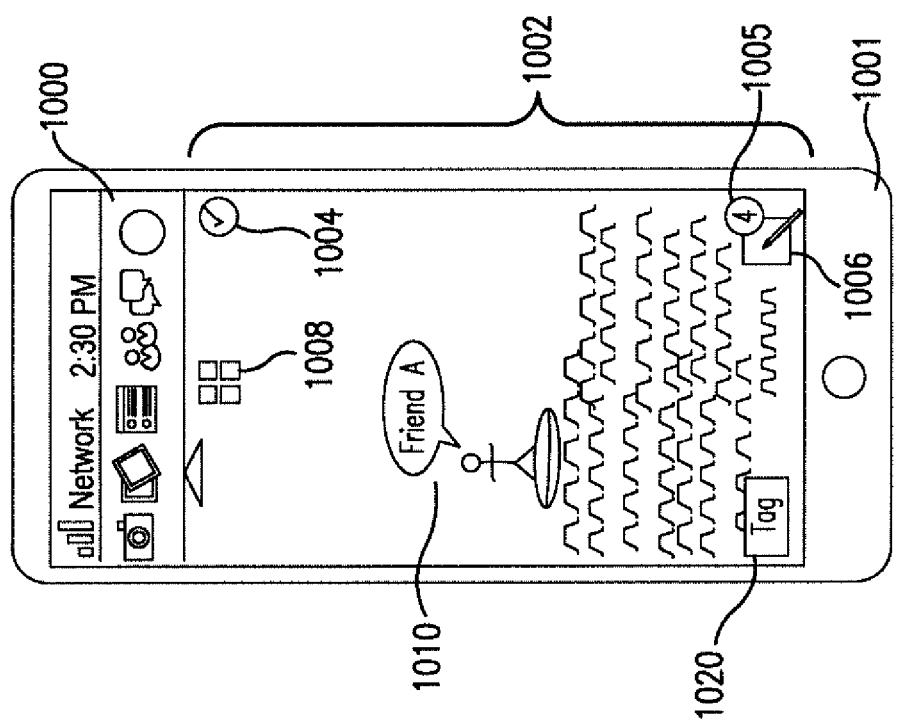
FIG. 10B
FIG. 10A

SYSTEMS AND METHODS FOR MULTIPLE PHOTO FEED STORIES

CROSS-REFERENCE TO RELATED APPLICATIONS

The present application is a continuation of U.S. application Ser. No. 13/591,512 filed Aug. 22, 2012, now U.S. Pat. No. 9,378,393, which is a continuation-in-part of U.S. Pat. No. 9,246,958, filed Aug. 2, 2012, the disclosures of each are hereby incorporated by reference in its entirety.

FIELD OF THE INVENTION

The present invention relates to the field of social networking. More particularly, the present invention provides a technique for selecting multiple images within a user interface of a social networking system.

BACKGROUND

Internet social networks have become a significant phenomenon. Social networks allow an internet user to create an account and a user profile, often for free, and interact with other users of the social network. A social network user can gain access to the profile of another user by requesting to add him or her as a friend. Once approved, the "friendship" typically gives both users access to each other's profiles and the content posted on them. Friends' posts may appear as news stories in each other's news feeds, and friends can usually comment on each other's news stories. Social network users typically seek to assemble a group of friends or followers with whom they interact. Often, most information on a user's profile is only accessible to the user's friends.

Social networks are providing users with increasingly sophisticated functionality. Early social networks offered little more than a simple interface for users to communicate and post messages. Now, on many social networks, users may share numerous different types of content and interact with each other's content in a variety of ways. Content shared on a social network may include digital media such as images. Users may assemble albums that include photographs and other content and share their albums with their friends. Because of their collaborative nature, social networks have now become a popular means by which many people share photos and other media content.

In addition, as technology has evolved, social networks have introduced tools for accessing social networking systems from a growing variety of technology platforms. Initially, because most users accessed the Internet exclusively from desktop computers, user interfaces of social networking systems were designed with desktop web browsers in mind. However, the exponential growth of mobile computing has facilitated Internet access from a variety of different devices and platforms. Because each technology platform has different technical capabilities and limitations, interfaces of social networks customized for a particular platform are needed.

SUMMARY

To allow for ease of navigation within a photo browsing interface of a social networking system, embodiments of the invention include systems, methods, and computer readable media to facilitate selection of multiple photos within an interface of a social networking system. A designation of a first image is received from within at least one of a single-image view and a camera view. Based on the designation, the first image is added to a communication.

In an embodiment, the first image may be received from a camera. The first image may be received from within a social networking application or from within a dedicated camera application. The single image view may be a gallery view.

In an embodiment, the communication may be provided to the social networking system. The communication may comprise text associated with the first image. In another embodiment, a de-designation of the first image for sharing may be received. The first image may be removed from the communication. A designation of a second image for sharing may be received. The second image may be added to the communication.

In an embodiment, receiving the designation of the first image for sharing may be based on a user selection of a check mark option. Receiving the designation of the first image for sharing may be based on a user selection of a share shutter option. Receiving the designation of the first image for sharing may be based on a voice command. Receiving the designation of the first image for sharing may be based on an interaction with an input mechanism. The input mechanism may be a touchscreen or a pointing device.

In an embodiment, a reference indicative of a number of images designated for sharing may be displayed. A number for display may be incremented when an additional image is designated for sharing.

In another embodiment, the privacy level of the communication and the designated images is based on the privacy setting selected by a user. The privacy level of the communication and the designated images will be the same within the social networking system. The user may select a privacy setting to allow only himself to have access to the communication and the designated images. Or the user may select a privacy setting to allow his friends on the social networking system to have access to the communication and the designated images.

In an alternative embodiment, the communication and the designated images may contain tag data identifying one or more people on a social networking system. The privacy level of the communication and the designated images is adjusted according to the one or more people identified in the tag data. Based on the privacy settings selected by the user, the tagged people may have access to the communication and designated images. Or alternatively, the friends of the tagged people may have access to the communication and designated images as well.

Many other features and embodiments of the invention will be apparent from the accompanying drawings and from the following detailed description.

BRIEF DESCRIPTION OF THE DRAWINGS

FIG. 2A illustrates a user of a social networking system copying to his computer a photograph taken with his digital camera in accordance with an embodiment of the invention.

FIG. 2B illustrates the user accessing a user interface to upload the photograph to the social networking system in accordance with an embodiment of the invention.

FIG. 2C illustrates the photograph uploaded to the social networking system and displayed within a user interface in accordance with an embodiment of the invention.

FIG. 5A illustrates a gallery view within an interface of the social networking application on a mobile device in accordance with an embodiment of the invention.

FIG. 5B illustrates a thumbnail view within the interface of the social networking application on the mobile device in accordance with an embodiment of the invention.

FIG. 5C illustrates a message compose view within the interface of the social networking application on the mobile device in accordance with an embodiment of the invention.

FIG. 7A illustrates a camera view within an interface of the social networking application on a mobile device in accordance with an embodiment of the invention.

FIG. 7B illustrates a gallery view within the interface of the social networking application on a mobile device in accordance with an embodiment of the invention.

FIG. 7C illustrates a thumbnail view within the interface of the social networking application on a mobile device in accordance with an embodiment of the invention.

FIG. 10A illustrates a gallery view in which a person on the social networking system is tagged in an image in accordance with an embodiment of the disclosed subject matter.

FIG. 10B illustrates a thumbnail view in which multiple images are designated in accordance with an embodiment of the disclosed subject matter.

Figure 1:
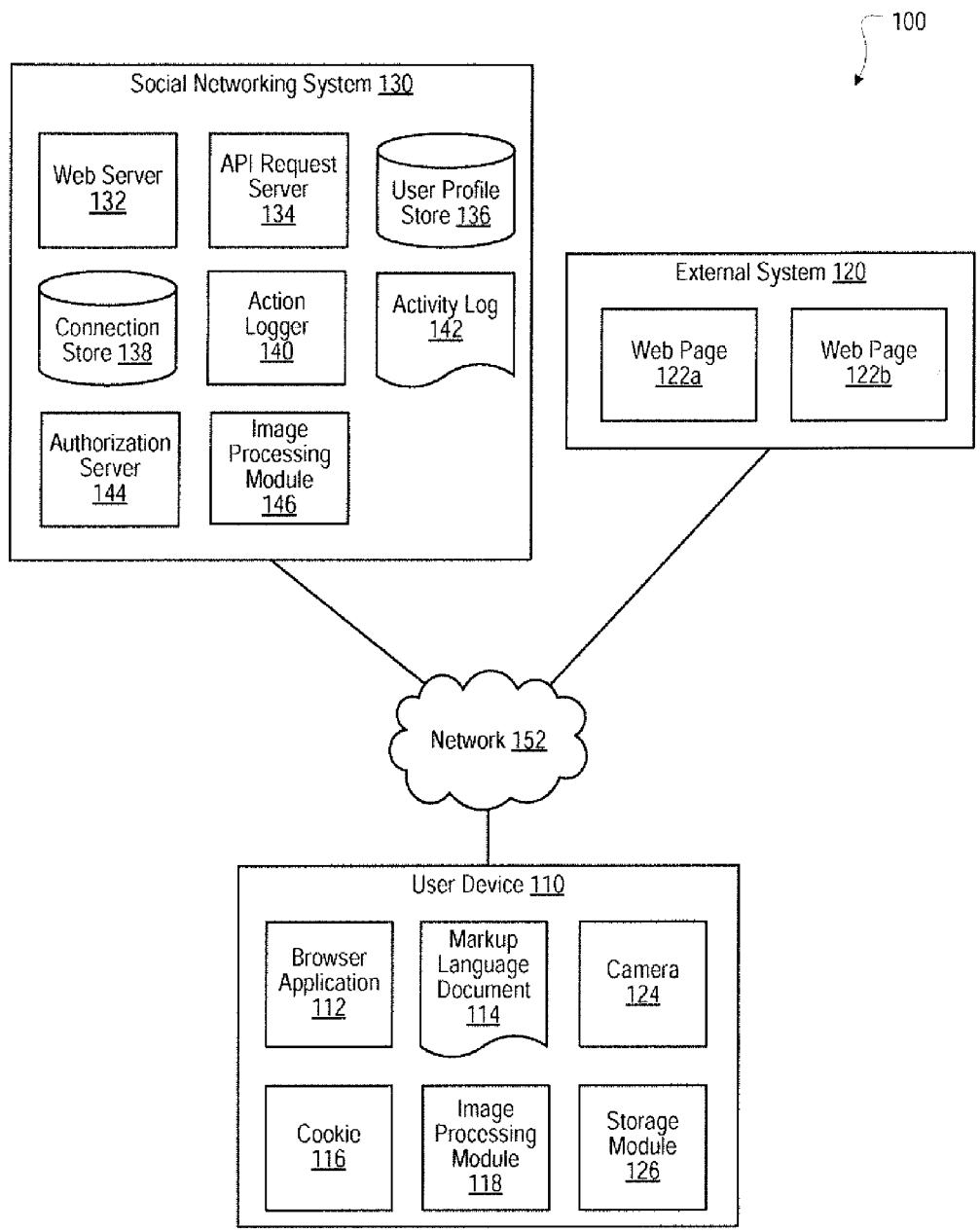
FIG. 1 illustrates a network diagram of a system for selecting multiple images within a user interface of a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social Networking System—General Introduction

FIG. 1 is a network diagram of a system 100 for selecting multiple images within a mobile user interface of a social networking system in accordance with an embodiment of the invention. The system 100 includes one or more user devices 110, one or more external systems 120, the social networking system 130, and a network 150. For purposes of illustration, the embodiment of the system 100, shown by FIG. 1, includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform or backbone, which other systems, such as external systems 120, may use to provide social networking services and functionalities to users across the Internet.

The user device 110 comprises one or more computing devices that can receive input from a user and transmit and receive data via the network 150. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 150. The user device 110 can execute an application, for example, a browser application that allows a user of the user device 110 to interact with the social networking system 130. In another embodiment, the user device 110 interacts with the social networking system 130 through an application programming interface (API) provided by the native operating system of the user device 110, such as iOS 4 and ANDROID. The user device 110 is configured to communicate with the external system 120 and the social networking system 130 via the network 150, which may comprise any combination of local area and/or wide area networks, using wired and/or wireless communication systems.

In one embodiment, the network 150 uses standard communications technologies and protocols. Thus, the network 150 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 150 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 150 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, the markup language document 114 may include JavaScript Object Notation (JSON) data, JSON with padding (JSONP), and JavaScript data to facilitate data-interchange between the external system 120 and the user device 110. The browser application 112 on the user device 110 may use a JavaScript compiler to decode the markup language document 114.

The markup language document 114 may also include, or link to, applications or application frameworks such as FLASH™ or Unity™ applications, the SilverLight™ application framework, etc.

In one embodiment, the user device 110 also includes one or more cookies 116 including data indicating whether a user of the user device 110 is logged into the social networking system 130, which may enable customization of the data communicated from the social networking system 130 to the user device 110. In one embodiment, the user device 110 also includes an image processing module 118, a camera 124, and a storage module 126.

The external system 120 includes one or more web servers that include one or more web pages 122a, 122b, which are communicated to the user device 110 using the network 150. The external system 120 is separate from the social networking system 130. For example, the external system 120 is associated with a first domain, while the social networking system 130 is associated with a separate social networking domain. Web pages 122a, 122b, included in the external system 120, comprise markup language documents 114 identifying content and including instructions specifying formatting or presentation of the identified content.

The social networking system 130 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure.

Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130. For example, in an embodiment, if users in the social networking system 130 are represented as nodes in the social graph, the term "friend" can refer to an edge formed between and directly connecting two user nodes.

Connections may be added explicitly by a user or may be automatically created by the social networking system 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of the social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (i.e., social networks of people, entities, and concepts) to which users of the social networking system 130 may belong, events or calendar entries in which a user might be interested, computer-based applications that a user may use via the social networking system 130, transactions that allow users to buy or sell items via services provided by or through the social networking system 130, and interactions with advertisements that a user may perform on or off the social networking system 130. These are just a few examples of the items upon which a user may act on the social networking system 130, and many others are possible. A user may interact with anything that is capable of being represented in the social networking system 130 or in the external system 120, separate from the social networking system 130, or coupled to the social networking system 130 via the network 150.

The social networking system 130 is also capable of linking a variety of entities. For example, the social networking system 130 enables users to interact with each other as well as external systems 120 or other entities through an API, a web service, or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party. Content "items" are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 140, an activity log 142, an authorization server 144, and an image processing module 146. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user account store 136 maintains information about user accounts, including biographic, demographic, and other types of descriptive information, such as work experience, educational history, hobbies or preferences, location, and the like that has been declared by users or inferred by the social networking system 130. This information is stored in the user account store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user account store 136 and the connection store 138 store instances of the corresponding type of objects maintained by the social networking system 130. Each object type has information fields that are suitable for storing information appropriate to the type of object. For example, the user account store 136 contains data structures with fields suitable for describing a user's account and information related to a user's account. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user profile in the user account store 136, assigns a unique identifier to the user account, and begins to populate the fields of the user account with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user account store 136 and the connection store 138 may be implemented as a federated database.

Data stored in the connection store 138, the user account store 136, and the activity log 142 enables the social networking system 130 to generate the social graph that uses nodes to identify various objects and edges connecting nodes to identify relationships between different objects. For example, if a first user establishes a connection with a second user in the social networking system 130, user accounts of the first user and the second user from the user account store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user account store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 150. The web server 132 serves web pages, as well as other web-related content, such as Java, JavaScript, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to call access information from the social networking system 130 by calling one or more API functions. The API request server 134 may also allow external systems 120 to send information to the social networking system 130 by calling APIs. The external system 120, in one embodiment, sends an API request to the social networking system 130 via the network 150, and the API request server 134 receives the API request. The API request server 134 processes the request by calling an API associated with the API request to generate an appropriate response, which the API request server 134 communicates to the external system 120 via the network 150. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 140 is capable of receiving communications from the web server 132 about user actions on and/or off the social networking system 130. The action logger 140 populates the activity log 142 with information about user actions, enabling the social networking system 130 to discover various actions taken by its users within the social networking system 130 and outside of the social networking system 130. Any action that a particular user takes with respect to another node on the social networking system 130 may be associated with each user's account, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 140 may receive data describing a user's interaction with an external system 120 from the web server 132. In this example, the external system 120 reports a user's interaction according to structured actions and objects in the social graph.

Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information, but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 144 contains logic to determine if certain information associated with a user can be accessed by a user's friends, external systems 120, and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

The image processing module 146 of the social networking system 130 and the image processing module 118 of the user device 110 provide image management capabilities. In an embodiment, the image processing module 118 receives images captured by a camera 124 within the user device 110 or provided to the user device 110 from another source. The images may be saved to a storage module 126 within the user device 110. A user input applied to the user device 110 may cause an image saved in the storage module 126 to be designated for sharing, added to a message, and provided to the social networking system 130. The functionality of designating images for sharing is described in further detail below.

Multiple Photo Selection

Users may take advantage of the collaborative features and functionality of the social networking system 130 to upload and share digital images. A user of the social networking system 130 may upload a profile picture that features prominently on her profile and identifies her to friends and other users. A user may also upload a cover image that may be displayed as a banner across the top of the user's profile. In addition to a profile picture and a cover image, a user may upload images to share with other users, such as photographs of an event, artwork, professional photography portfolios, photos from nature, or any other type of digital images.

Figure 2D:
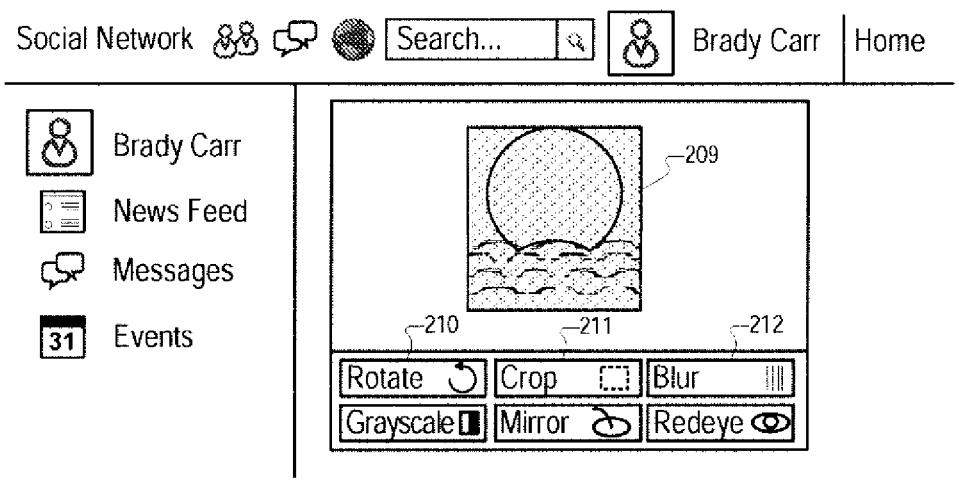
FIG. 2D illustrates the user applying a number of edits to the photograph, resulting in an altered photograph in accordance with an embodiment of the invention.

FIGS. 2A-2D illustrate online photo sharing functionality of the social networking system 130 in accordance with an embodiment of the invention. In FIG. 2A, user Brady Carr has copied to his computer 201 a photograph 202 taken with his digital camera 203. In FIG. 2B, Brady Carr has accessed a user interface 204 to upload the photograph 202 to the social networking system 130. Brady Carr selects an upload option 205 within the user interface 204 that prompts him to browse to the location of the photograph on the local storage of his computer 201. He finds the photograph 202 and selects the 'OK' option 206. In FIG. 2C, the photograph 202 has been uploaded to the social networking system 130 and is displayed within the user interface 204. The user interface 204 in FIG. 2C includes a photo editing panel 207 with an options toolbar 208. In FIG. 2D, Brady Carr has applied a number of edits to the photograph 202, resulting in the altered photograph 209. These edits include a 90 degree rotation, indicated by the 'rotate' button 210, a crop, indicated by the 'crop' button 211, and a blur, indicated by the 'blur' button 212. Brady Carr may finalize and submit these edits by selecting the 'Save' option.

With the advent of mobile devices that include built-in cameras and connect to wireless data networks, photo sharing has become an increasingly prominent feature of social networking systems. In FIGS. 2A-2D, Brady Carr has shared the photograph 202 by capturing the photograph 202 with the digital camera 203, transferring the photograph 202 from the digital camera 203 to the computer 201 using a wired connection, and uploading the photograph 202 from the computer 201 to the social networking system 130. However, camera-enabled mobile devices have made the process of sharing a photograph easier. An operator of the social networking system 130 may provide a social networking application for the mobile device that allows the user to easily upload photographs directly from his mobile device. Moreover, because people may carry mobile devices such as smartphones with them more often than they carry dedicated cameras, they may have more opportunities to capture photographs and share them.

The camera of the mobile device may be used to capture images from within a dedicated camera application or from within the social networking application on the mobile device. Images captured by the camera may be stored in a local storage module within the mobile device, such as the storage module 126, for later use. Images captured by the camera, or other images stored in the local storage module within the mobile device, may be uploaded to the social networking system 130 using the social networking application. According to one embodiment of the invention, the camera application may be initialized separately from the social network application, and an option to upload images to the social networking system 130 using the social networking application may be selected from within the camera application. According to another embodiment, the camera may be accessed from within the social networking application. Images that are captured using the camera or otherwise stored on the mobile device may be viewed within a single-image view, wherein one image is displayed within the interface of the mobile device. A single-image view may refer to a gallery view. Alternatively, images that are captured using the camera or otherwise stored on the mobile device may be viewed within a multi-image view, wherein multiple images are simultaneously displayed in compact form within the interface of the mobile device. A multi-image view may refer to a thumbnail view.

Figures 3A, 3B, 3C:
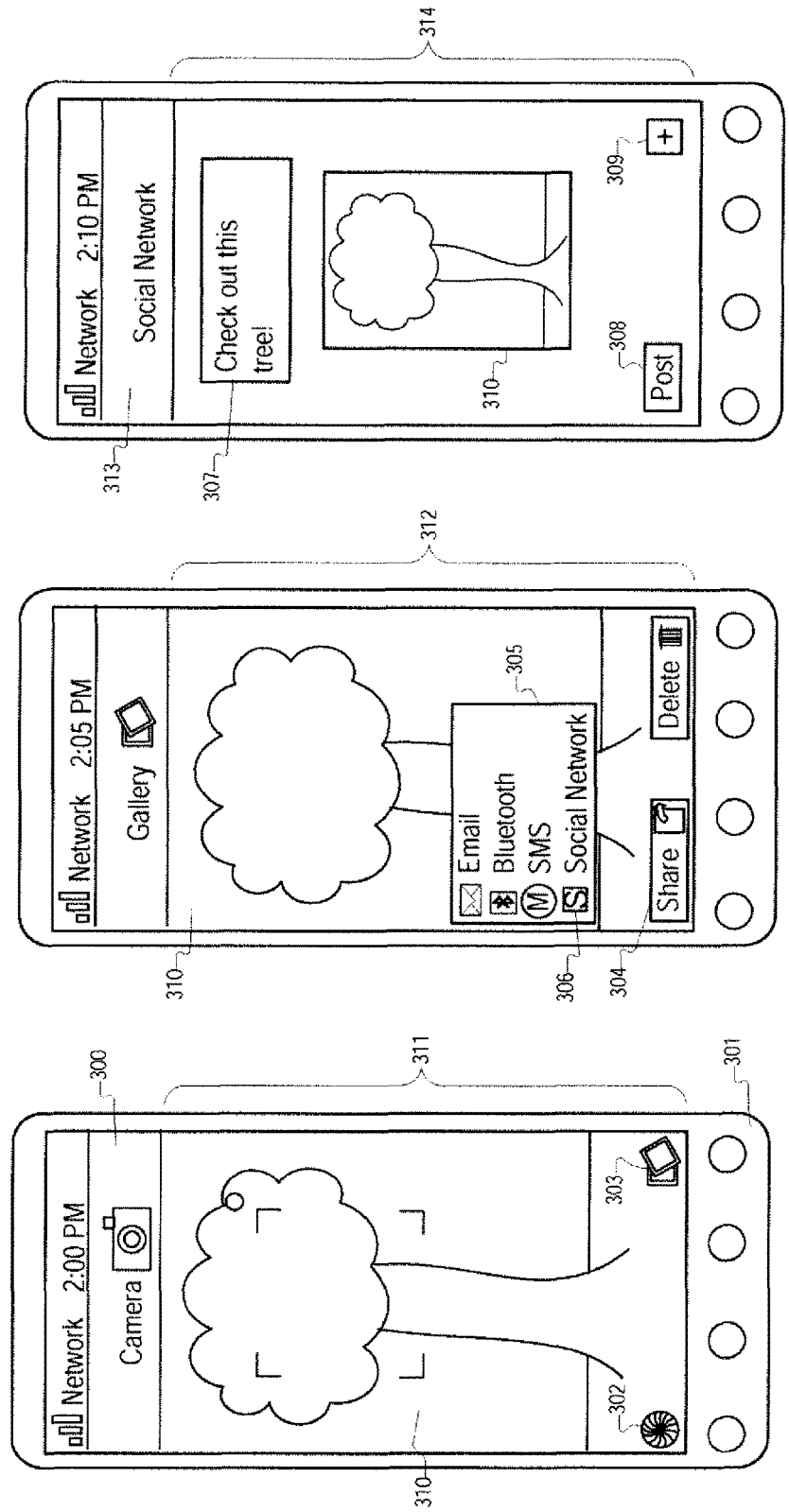
FIG. 3A illustrates a camera view within an interface of a camera application on a mobile device in accordance with an embodiment of the invention.
FIG. 3B illustrates a gallery view within the interface of the camera application on the mobile device in accordance with an embodiment of the invention.
FIG. 3C illustrates a message compose view within the interface of a social networking application on the mobile device in accordance with an embodiment of the invention.

FIG. 3A illustrates a camera view 311 within an interface 300 of a camera application on a mobile device 301 in accordance with an embodiment of the invention. In the illustrated example, a user is capturing an image 310 of a tree from within the camera view 311 using a camera of the mobile device 301. Upon pressing a shutter button 302, the image 310 is captured and saved to a local storage module within the mobile device 301, such as the storage module 126. The user may select a gallery option 303 within the interface 300 to view the image 310 or other images stored on the mobile device 301 within a single-image view. Alternatively, the single-image view may be automatically initialized upon capturing the image, with the image 310 displayed within the single-image view. According to one embodiment, the single-image view may be a gallery view.

FIG. 3B illustrates a gallery view 312 within the interface 300 of the camera application on the mobile device 301 in accordance with an embodiment of the invention. In the illustrated example, the user is viewing the image 310 within the gallery view 312. The user selects an option 304 to share the image, which causes a menu 305 of sharing options to appear. Among the sharing options is an option 306 to share the image via a social network. The user may select this option and initialize a social networking application for providing the image 310 to the social networking system 130.

FIG. 3C illustrates a message compose view 314 within an interface 313 of the social networking application on the mobile device 301 in accordance with an embodiment of the invention. In the illustrated example, the user is composing a message comprising the image 310 and text 307 within the message compose view 314. The text 307, "Check out this tree!," may accompany the image 310 as a caption or commentary. The user may add more images to the message by selecting an add option 309. The user may select a 'Post' option 308 and cause the image to be uploaded to the social networking system 130.

Figures 4A, 4B, 4C:
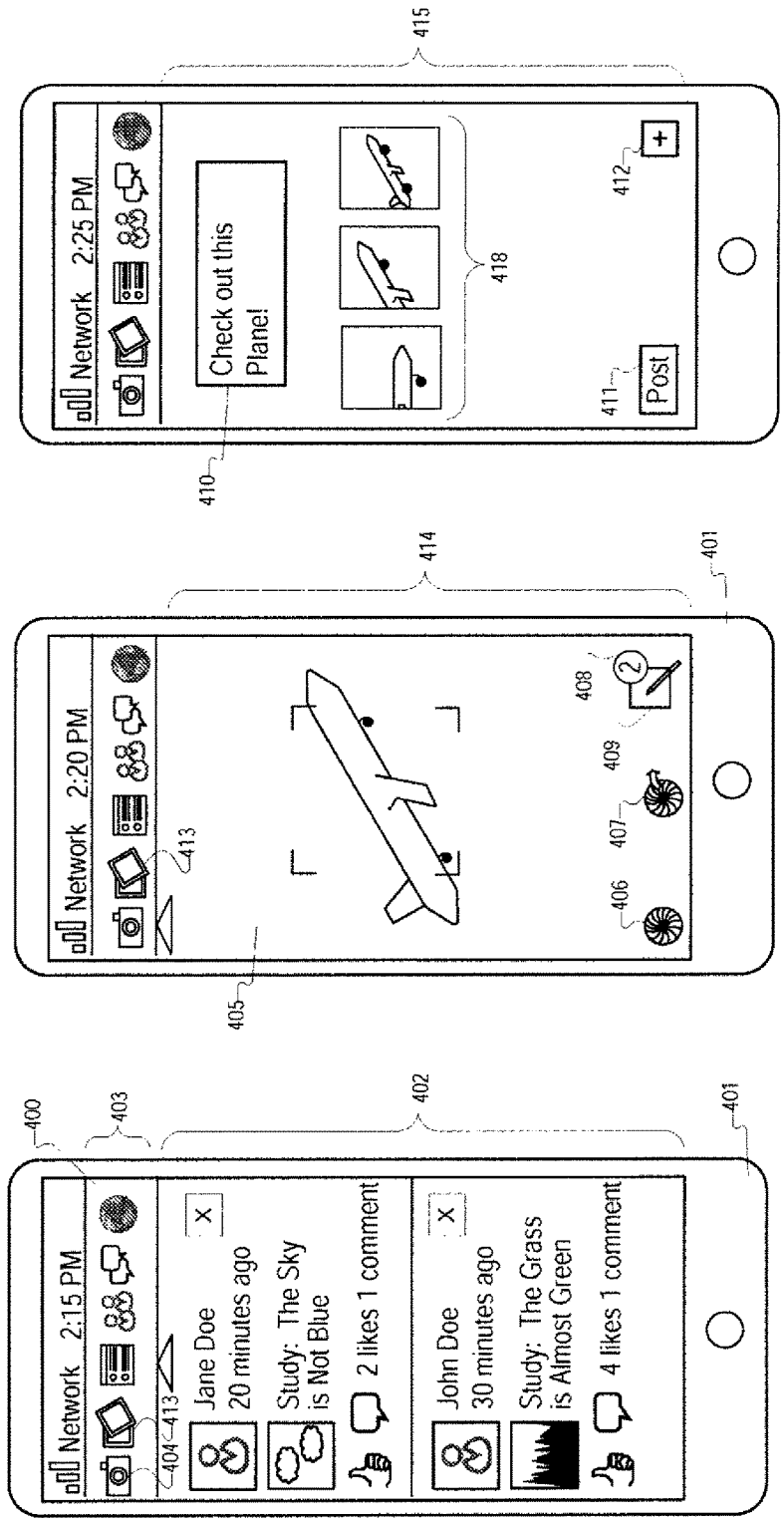
FIG. 4A illustrates a home screen view within an interface of the social networking application on a mobile device in accordance with an embodiment of the invention.
FIG. 4B illustrates a camera view within the interface of the social networking application on the mobile device in accordance with an embodiment of the invention.
FIG. 4C illustrates a message compose view within the interface of the social networking application on the mobile device in accordance with an embodiment of the invention.

According to another embodiment of the invention, the camera may be accessed from within the social networking application such that an image captured by the camera may be more easily selected for upload to the social networking system 130. FIG. 4A illustrates a home screen view 402 within an interface 400 of the social networking application on a mobile device 401 in accordance with an embodiment of the invention. In the illustrated example, the user has initialized the social networking application, which displays a news feed within the home screen view 402. From within an options menu 403, the user selects an option 404 to access functionality for capturing an image using a camera of the mobile device 401. The option 404 may allow the user to use the camera from within the interface 400 of the social networking application.

FIG. 4B illustrates a camera view 414 within the interface 400 of the social networking application on the mobile device 401 in accordance with an embodiment of the invention. In the illustrated example, the user is capturing an image 405 of an airplane taking off within the camera view 414. Upon pressing a standard shutter button 406 or a share shutter button 407, the image 405 is captured and saved to a local storage module within the mobile device 401, such as the storage module 126. If the user selects the share shutter button 407, the image 405 is automatically designated for sharing and automatically added to a message or communication without the need to receive any additional input commands or instructions from a user to prepare the image for sharing with the message. A single selection prepares the image to be shared in connection with the message. The camera view 414 remains within the interface 400 in order to allow the user to capture more images. The number of captured images that has been added to the message thus far is displayed within a badge 408 accompanying a message compose icon 409. In the illustrated example, two images have thus far been added to the message. When the user has finished capturing images for sharing, the user may select the message compose icon 409 and access the message containing all of the images he has captured using the share shutter button 407.

FIG. 4C illustrates a message compose view 415 within the interface 400 of a social networking application on the mobile device 401 in accordance with an embodiment of the invention. In the illustrated example, the user is composing a message including three images 418 and text 410 within the message compose view 415. The text 410, "Check out this plane!," may accompany the three images 418 as a caption or commentary. The user may add more images to the message by selecting an add option 412. The user may select a 'Post' option 411 and cause the three images 418 to be uploaded to the social networking system 130.

According to one embodiment of the invention, the user may select a gallery option 413 within the interface 400 to view images stored on the mobile device 401 within a single-image view. The single-image view may be a gallery view. FIG. 5A illustrates a gallery view 502 within an interface 500 of the social networking application on a mobile device 501 in accordance with an embodiment of the invention. In the illustrated example, the gallery view 502 displays an image 503 of a sunset. The image 503 may have been captured using a camera of the mobile device 501 or otherwise stored within the mobile device 501. The user may select a check mark option 504 to designate the image 503 for sharing and add it to a message. The user may continue browsing images in the gallery view 503 by, for example, swiping across the screen of the mobile device 501 using his finger, and designate additional images for sharing by selecting the check mark option 504 and adding them to the message. According to one embodiment, the user may apply edits to the currently displayed image by selecting an edit option 507, which may activate a photo editing interface similar to the photo editing panel 207 (as shown in FIG. 2C).

The number of captured images that has been added to the message thus far is displayed within a badge 505 accompanying a message compose icon 506. In the illustrated example, four images have thus far been added to the message. To remove an image from the message—i.e., to "un-designate" an image for sharing—the user may browse to a designated image within the gallery view 502 and de-select the check mark option 504. The user may delete the image by selecting the delete option 520.

According to one embodiment of the invention, the user may select a thumbnail view option 508 within the interface 500 to view images stored on the device within a multi-image view. The multi-image view may be a thumbnail view. FIG. 5B illustrates a thumbnail view 509 within the interface 500 of the social networking application on the mobile device 501 in accordance with an embodiment of the invention. The gallery view 509 displays images 510, 511, 512, 513, 514. Each of the images 510, 511, 512, 513 has a check mark option to designate the image for sharing and add it to a message. The check mark option appears checked for images that have been designated for sharing and unchecked for images that have not been designated for sharing. In the illustrated example, the images 510, 511, 512, and 513 have been designated for sharing, and the image 514 has not been designated for sharing. According to an embodiment, if the number of images exceeds the available space within the thumbnail view 509, the additional images may be seen on a next page (not pictured) that the user may access by, for example, swiping his finger across the screen of the mobile device 501. The number of images that has been added to the message thus far is displayed within the badge 505 accompanying the message compose icon 506. In the illustrated example, four images have thus far been added to the message. The user may return to the gallery view 502 by selecting a return option 515.

When the user has finished designating images for sharing, the user may select the message compose icon 506 within the gallery view 502 or the thumbnail view 509 and access the message containing the images he has designated for sharing. If the user selects the message compose icon 506 from within the gallery view 502 without having designated any images for sharing, the image that is currently displayed may be implicitly designated for sharing and automatically added to the message. If the user selects the message compose icon 506 from within the thumbnail view 509 without having designated any images for sharing, the first image in the upper left of the thumbnail view 509 may be implicitly designated for sharing and automatically added to the message.

FIG. 5C illustrates a message compose view 521 within the interface 500 of the social networking application on the mobile device 501 in accordance with an embodiment of the invention. In the illustrated example, the user is composing a message including four images 518 and text 516 within the message compose view 521. The text 516, "Great pies!,"

may accompany the four images 518 as a caption or commentary. The user may add more images to the message by selecting an add option 519. The user may select a 'Post' option 517 and cause the three images 518 to be uploaded to the social networking system 130.

Figure 6:
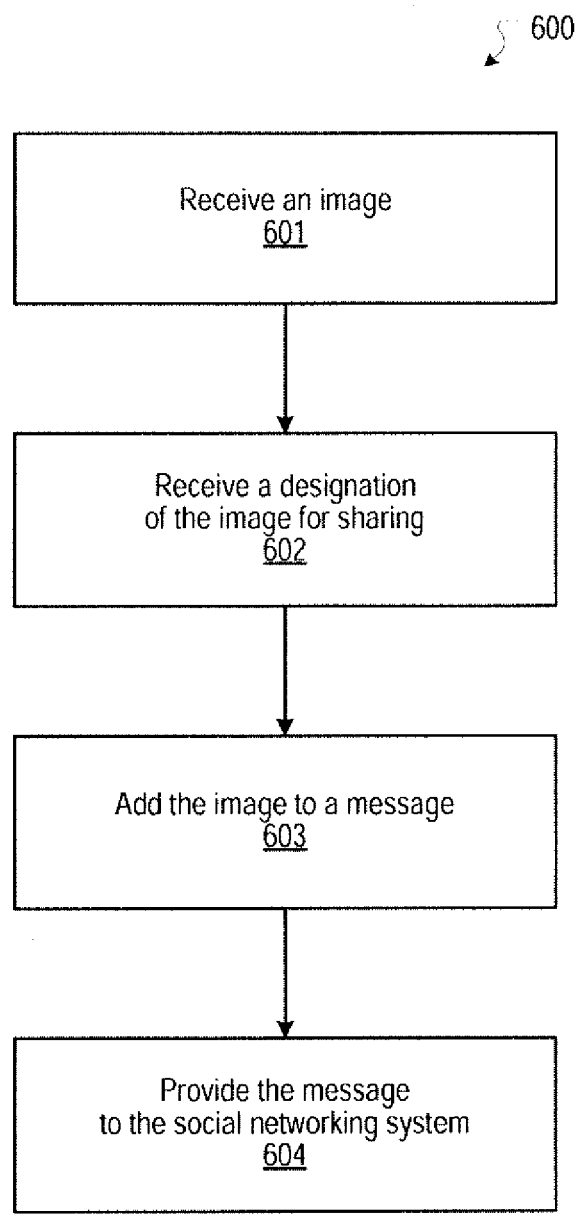
FIG. 6 illustrates a process for selecting multiple images in accordance with an embodiment of the invention.

FIG. 6 illustrates a process 600 for selecting multiple images in accordance with an embodiment of the invention. At block 601, a user device 110 receives an image. The image may have been captured from within a dedicated camera application or a social networking application using a camera built in to the user device 110. Alternatively, the image may have been received by the user device 110 from another source. The image may be stored in a storage module 126 within the user device 110. At block 602, the user device 110 receives a designation of the image for sharing. The designation may be received from within a camera view based on a user selection of, for example, a share shutter option. Alternatively, the designation may be received from within a single-image view such as a gallery view based on a user selection of, for example, a check mark option. At block 603, the user device 110 automatically adds the image to a communication without the need to receive any additional input or instructions from a user of the user device 110. A single selection allows the image to be associated with the communication. At block 604, the user device 110 provides the communication to the social networking system 130. The process 600 may be performed in whole or in part by the image processing module 118, the storage module 126, or other modules of the user device 110.

According to one embodiment of the invention, the user may receive a visual indication when an image is designated for sharing. Although the number of images designated for sharing may be displayed within a badge icon accompanying a message compose option, the user may not notice an increment in the number within the badge upon designating the image for sharing. Because many mobile devices accept user input via touchscreens, it may sometimes be difficult to determine whether the touchscreen has detected a selection or not. This may be the case if the user's finger makes accidental contact with the touchscreen and the touchscreen detects a selection that the user did not intend, or if the user intends to make a selection but the touchscreen does not detect the selection because the user's finger did not make close enough contact with the touchscreen. Accordingly, it may be desirable to provide the user with a confirmation of his selection of the image in the form of an animation.

FIG. 7A illustrates a camera view 702 within an interface 700 of a social networking application on a mobile device 701 in accordance with an embodiment of the invention. To facilitate illustration, an arrow 704 is shown proceeding from the center of the camera view 702, indicated by the focus frame 703, to a message compose option 705. The arrow 704 indicates that a visual animation including a movement from the center of the camera view 702 to the message compose option 705 is displayed when a user captures the image 717 and designates the image 717 for sharing by selecting a share shutter button 716. The number within a badge 706 accompanying the message compose option 705 increments to reflect the addition of the image 717 to a message.

FIG. 7B illustrates a gallery view 714 within the interface 700 of a social networking application on the mobile device 701 in accordance with an embodiment of the invention. To facilitate illustration, an arrow 708 is shown proceeding from the center of the gallery view 714 to a message compose option 709. The arrow 708 indicates that a visual animation including a movement from the center of the gallery view 714 to the message compose option 709 is displayed when a user designates an image 718 for sharing by selecting a check mark option 707. The number within a badge 710 accompanying the message compose option 709 increments to reflect the addition of the image 718 to a message.

FIG. 7C illustrates a thumbnail view 715 within the interface 700 of a social networking application on the mobile device 701 in accordance with an embodiment of the invention. To facilitate illustration, an arrow 711 is shown proceeding from the image 710 to a message compose option 712. The arrow 711 indicates that a visual animation including a movement from the image 710 to the message compose option 712 is displayed when a user designates an image 710 for sharing by selecting the check mark option within the image 710. The number within a badge 713 accompanying the message compose option 712 increments to reflect the addition of the image 710 to a message.

Figure 7D:
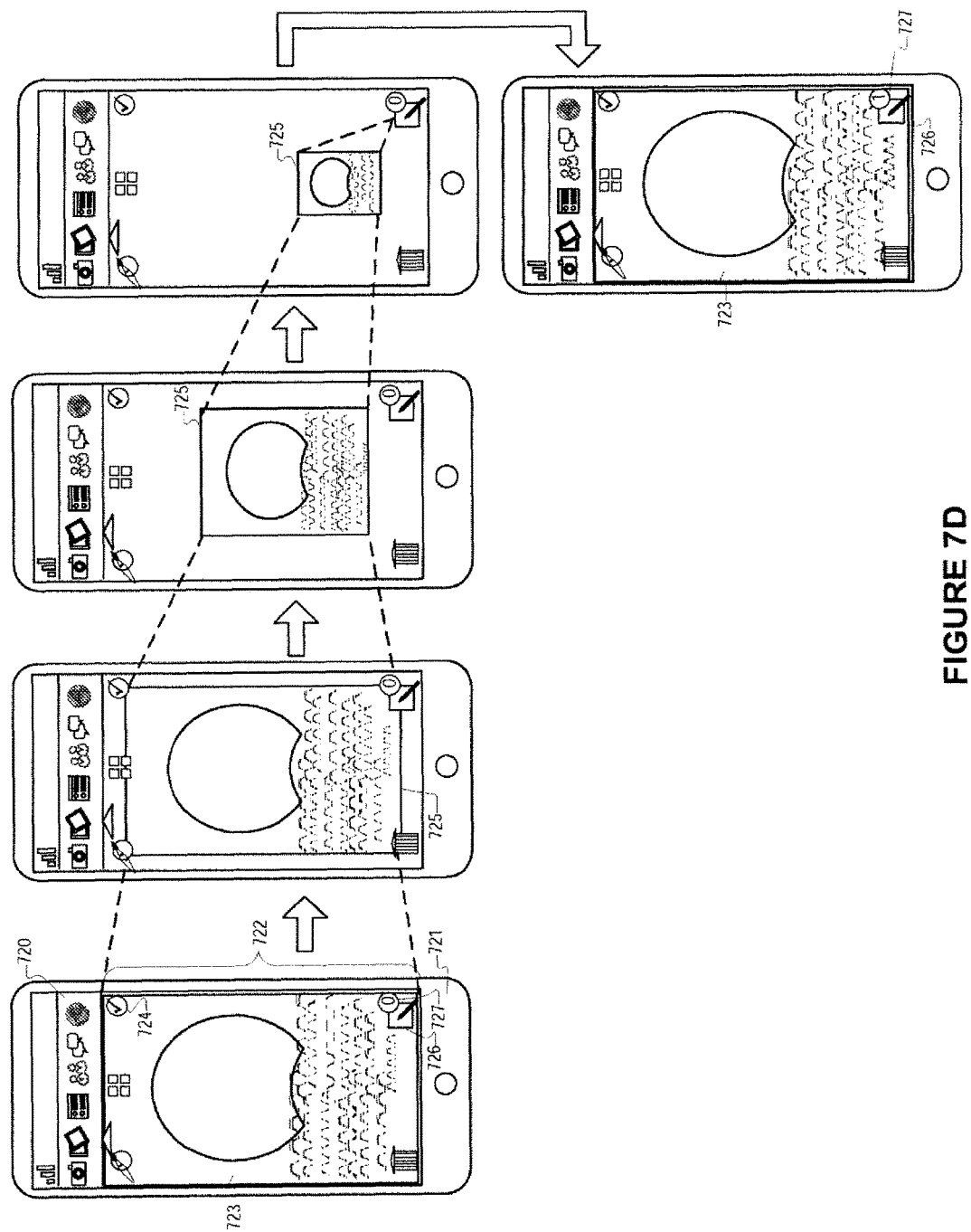
FIG. 7D illustrates a miniaturization effect in a gallery view within an interface of the social networking application on a mobile device in accordance with an embodiment of the invention.

The animation indicated by the arrows in FIGS. 7A, 7B, and 7C may appear in many forms. According to an embodiment, the animation may include a miniaturization effect in which a copy of the image designated for sharing is displayed and appears to progressively shrink as it proceeds from a first location on the screen towards a second location on the screen. FIG. 7D illustrates a miniaturization effect in a gallery view 722 within an interface 720 of a social networking application on a mobile device 721 in accordance with an embodiment of the invention. In the illustrated example, a user designates an image 723 for sharing by selecting a check mark option 724. Upon the user selecting the check mark option 724, a copy 725 of the image 723 is displayed. The copy 725 is initially centered over the gallery view 722, but gradually shrinks, or miniaturizes, and proceeds towards a message compose icon 726. As the animation completes, the copy 725 has shrunk to the point that it has disappeared, producing a visual effect indicating that the image 723 has been designated for sharing and added to a message. In addition, a number within a badge 727 accompanying the message compose icon 726 increments from zero to one. After the animation concludes, the image 723 may be displayed in its original form as shown.

Figure 8:
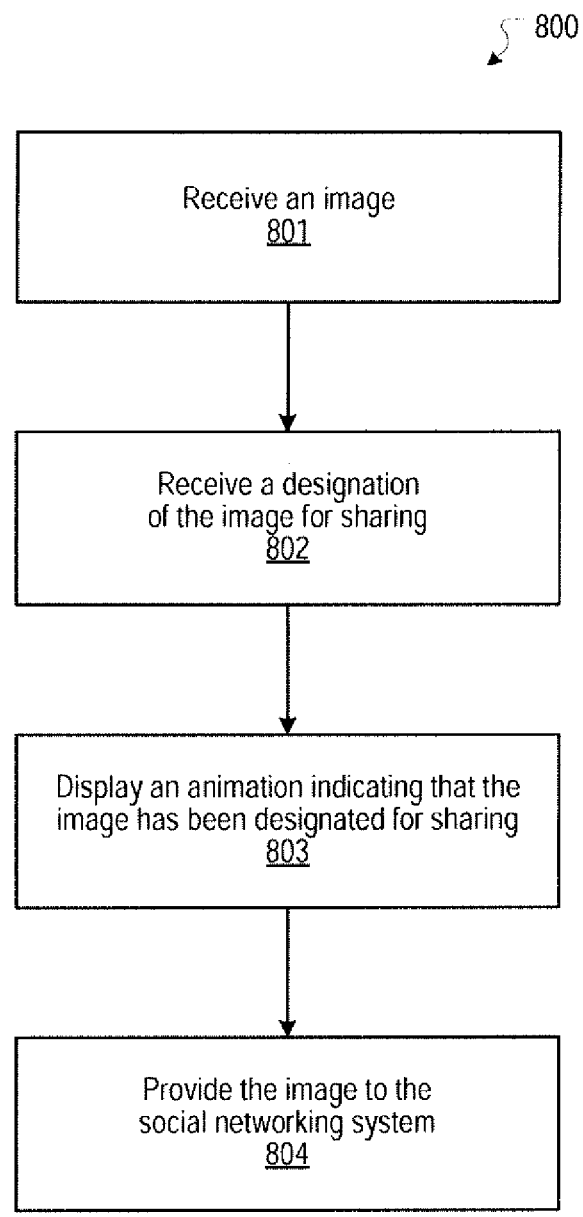
FIG. 8 illustrates a process for displaying an animation to indicate a user designation of an image for sharing.

FIG. 8 illustrates a process 800 for displaying an animation to indicate a user designation of an image for sharing. At block 801, a user device 110 receives an image. The image may have been captured from within a dedicated camera application or a social networking application using a camera built in to the user device 110. Alternatively, the image may have been received by the user device 110 from another source. The image may be stored in a storage module 126 within the user device 110. At block 802, the user device 110 receives a designation of the image for sharing from within a view. The designation may be received from within a camera view via a user selection of, for example, a share shutter option. Alternatively, the designation may be received from within a single-image view such as a gallery view via a user selection of, for example, a check mark option. Alternatively, the designation may be received from within a multi-image view such as a thumbnail view via a user selection of, for example, an image to be shared. At block 803, the user device displays an animation indicating that the image has been designated for sharing. The animation may comprise a miniaturization effect, or any other visual element. The miniaturization effect may include displaying a copy of the image and gradually shrinking, or miniaturizing, the copy as it proceeds from a first location within the view to a second location within the view. The first location may be an icon representing the option used to designate the image for sharing. The second location may be an icon representing a message compose option. At block 804, the user device 110 provides the image to the social networking system 130. The process 800 may be performed in whole or in part by the image processing module 118, the storage module 126, or any other module of the user device 110.

Although the preceding examples have been described with reference to mobile devices, the embodiments described herein may be implemented on any type of user device 110. On a device with a touchscreen, such as a mobile device or a tablet device, a user selection of an option may be received via the user touching a position on the touchscreen corresponding to an icon representing the option that the user intends to select. On a device with an input mechanism such as a pointing device, a user selection of an option may be received via the user manipulating the mechanism to move a pointer or other visual element into a position corresponding to an icon representing the option that the user intends to select, and pressing a button. A pointing device may refer to a mouse, a trackball device, or any mechanism for manipulating a pointer on a screen. In addition, selection of an option may be triggered by any other form of user input to the user device 110, such as a voice command.

FIG. 10A illustrates a gallery view 1002 within an interface 1000 of the social networking application on a mobile device 1001 in accordance with an embodiment of the invention. In the illustrated example, the gallery view 1002 displays an image 1010 of a person surfing in the ocean. In another embodiment, the gallery view could display any form of digital media, including images, videos, illustrations, or documents. The user may select a check mark option 1004 to designate the image 1010 for sharing and add it to a message. The user may continue browsing images in the gallery view 1002 by, for example, swiping across the screen of the mobile device 1001 using his finger, and designate additional images for sharing by selecting the check mark option 1004 and adding them to the message.

The number of captured images that has been added to the message thus far is displayed within a badge 1005 accompanying a message compose icon 1006, In the illustrated example, four images have thus far been added to the message. To remove an image from the message, the user may browse to a designated image within the gallery view 1002 and de-select the check mark option 1004. The user may also tag images with people using the 'Tag' button 1020. In image 1010, the user has tagged the image with Friend A, another user on the social networking system. The user may tag additional users in image 1010 using the tagging button 1020. The user may also continue browsing images in the gallery view 1002 and tag additional images with additional users using the tagging button 1020. In addition, the user may use the tagging button to remove tag data that already exists in image 1010.

According to one embodiment of the invention, the user may select a thumbnail view option 1008 within the interface 1000 to view images stored on the device within a multi-image view. FIG. 10B illustrates a thumbnail view 1009 within the interface 1000 of the social networking application on the mobile device 1001 in accordance with an embodiment of the invention. The thumbnail view 1009 displays images 1010, 1011, 1012, 1013, 1014. Each of the images has a check mark option to designate the image for sharing and to add it to a message. The check mark option appears checked for images that have been designated for sharing and unchecked for images that have not been designated for sharing with a message. In the illustrated example, the images 1010, 1011, 1012, and 1013 have been designated for sharing, and the image 1014 has not been designated for sharing. The number of images that has been added to the message thus far is displayed within the badge 1005 accompanying the message compose icon 1006. In the illustrated example, four images have thus far been added to the message. The user may return to the gallery view 1002 by selecting a return option 1015.

Figure 10D:
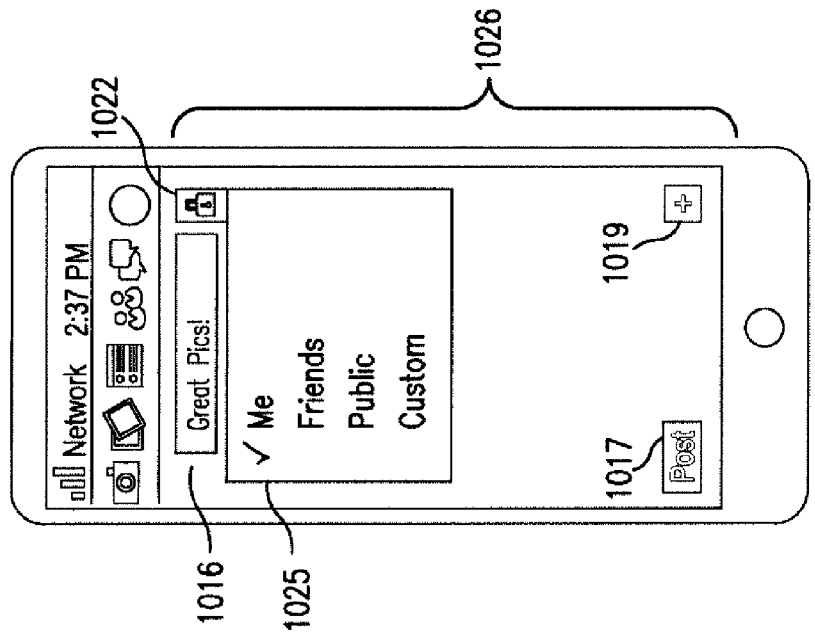
FIG. 10D illustrates a privacy setting view in which the privacy level of the communication and associated images are selected by the user in accordance with an embodiment of the disclosed subject matter.
Figure 10C:
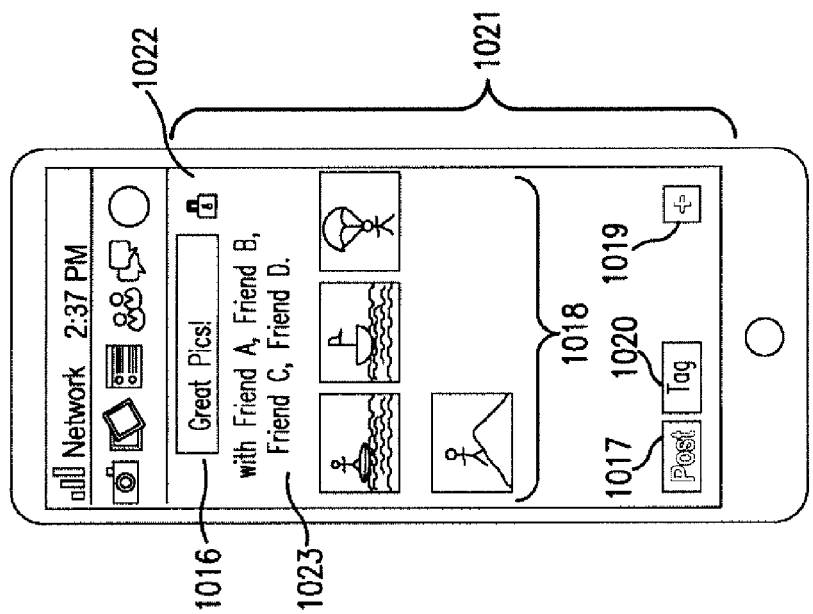
FIG. 10C illustrates a message compose view in which a communication is associated with multiple images in which multiple people on the social networking system are tagged in accordance with an embodiment of the disclosed subject matter.

When the user has finished designating images for sharing, the user may select the message compose icon 1006 within the gallery view 1002 or the thumbnail view 1009 and edit the message containing the images he has designated for sharing. FIG. 10C illustrates a message compose view 1021 within the interface 1000 of the social networking application on the mobile device 1001 in accordance with an embodiment of the invention. In the illustrated example, the user is composing a message including four images 1018 and text 1016 within the message compose view 1021. The text 1016, "Great Pies!," is associated with the four images 1018. The message includes a tagging display area 1023 listing all the people tagged in the message itself or in any of the associated images. In the exemplary embodiment, images 1010, 1011, 1012, and 1013 each have one unique person tagged in the image. For example, FIG. 10A shows that Friend A is tagged in image 1010 (likewise, Friend B is tagged in image 1011, Friend C is tagged in image 1012, and Friend D is tagged in image 1013). Accordingly, the tagging display area 1023 shows that there are four people tagged: Friend A, Friend B, Friend C, and Friend D. In addition, the user may tag additional people in the message itself using the 'Tag' button 1020. The user may add more images to the message by selecting an add button 1019. The user may select a 'Post' button 1017 and cause the message 1016 and the four images 1018 to be uploaded for sharing on the social networking system. The user may also select the privacy settings icon 1022 to determine the privacy level of the message and the images associated with the message when shared on the social networking system.

In one embodiment, the privacy level of the message and the privacy level of all the media associated with the message will always be the same. Therefore, if a person on the social networking system has access to the message, then he will also have access to all the media associated with the message. Likewise, if a person on the social networking system has access to any of the associated media, then he will also have access to the message and the remainder of the associated media. FIG. 10D illustrates the privacy setting view 1026 when the user has selected the privacy setting icon 1022. The privacy levels 1025 could include: Me, Friends, Public, and Custom. The privacy setting view 1025 shows that the privacy level is currently set to the "Me" setting. The privacy level selected by the user will determine who has access to the message and associated media. The privacy level will also be adjusted based on the people tagged in the message and associated media, as illustrated by the following two examples.

In one example, the user creates a message 1016 with four associated images 1018. The user has not tagged any people in the message 1016 or the associated images 1018. If the user selects the "Me" privacy setting, then the message 1016 and the associated images 1018 will only be shared with the user. If the user selects the "Friends" privacy setting, the message 1016 and the associated images 1018 will be shared with the friends of the user. If the user selects the "Public" privacy setting, then the message 1016 and the associated images 1018 will be shared with anyone on the social networking system. Lastly, the user can select a "Custom" privacy setting for the message 1016 and the associated images 1018.

In a second example, the user creates a message 1016 with four associated images 1018. The user tags one person in each image, so that four different people are tagged in the four images 1018. The privacy level for the message and associated media will be adjusted according to the people tagged in the message and associated media. If the user sets the privacy level of the message to the "Me" setting, then he and the four tagged people will have access to the message 1016 and the associated images 1018. If the user sets the privacy level of the message to the "Friends" setting, then the message 1016 and the associated images 1018 will be shared with the friends of the user and the friends of all four tagged people as well. In the "Friends" setting, the message and associated images will be accessible to both the friends of the user and the friends of all four tagged people on the social networking system.

Referring again to FIG. 10C, a message 1016 has four associated images 1018 and four tagged users in the tagging display area 1023. If the user selected the "Me" setting for the privacy level of the message 1016, then message 1016 and images 1018 will be shared only with the user and the people tagged in the message 1016 and images 1018 (i.e. the user, Friend A, Friend B, Friend C, and Friend D). If the user selected the "Friends" setting for the privacy level of message 1016, then message 1016 and images 1018 will be shared with the friends of both the user and the tagged people. Therefore, in the exemplary embodiment, if the user selected the "Friends" privacy setting, then the message 1016 and images 1018 will be shared with five networks of friends (i.e. the friend networks of the user, Friend A, Friend B, Friend C, and Friend D).

In another embodiment of the invention, the tags in the message 1016 and the associated images 1018 are completely dynamic with each other. So if the user deletes a tag to a person in the message 1016, then the tag for that person is deleted in both the message 1016 itself and all the associated images 1018 as well. Likewise, if the user deletes a tag to a person in one of the associated images 1018, then the tagged for that person is deleted in both the message 1016 and all the other associated images 1018 as well. For example, a user creates a message with tags of the same person in two associated images. If the user deletes one tag for the person, then the tags for same person in both images are automatically deleted. In other words, if one of the tags for a person is removed in the message 1016 or associated images 1018, then all of the tags for the same person is removed from the message 1016 and associated images 1018.

In an alternative embodiment, if the user changes the privacy level of the message, then the privacy level of the images associated with the message are dynamically changed as well. Likewise, if the user changes the privacy level of the any of the associated images, then the privacy level of the message and all the other associated images will be changed as well. In one example, the user has selected the "Me" privacy setting for message 1016 and associated images 1018. If a tag to a person is removed from message 1016 or one of the images 1018, then access to message 1016 and images 1018 will be automatically adjusted to restrict access to the person removed from the tag. In a second example, the user has selected the "Friends" privacy setting for message 1016 and associated images 1018. If a tag to a person is removed from message 1016 or one of the images 1018, then access to the message 1016 and images 1018 will be automatically adjusted to restrict access to the friends of the person removed from the tag. Therefore, the privacy level of the message and associated images will always remain the same, even when changes are made to the message or any of the associated images.

Hardware Implementation

Figure 9:
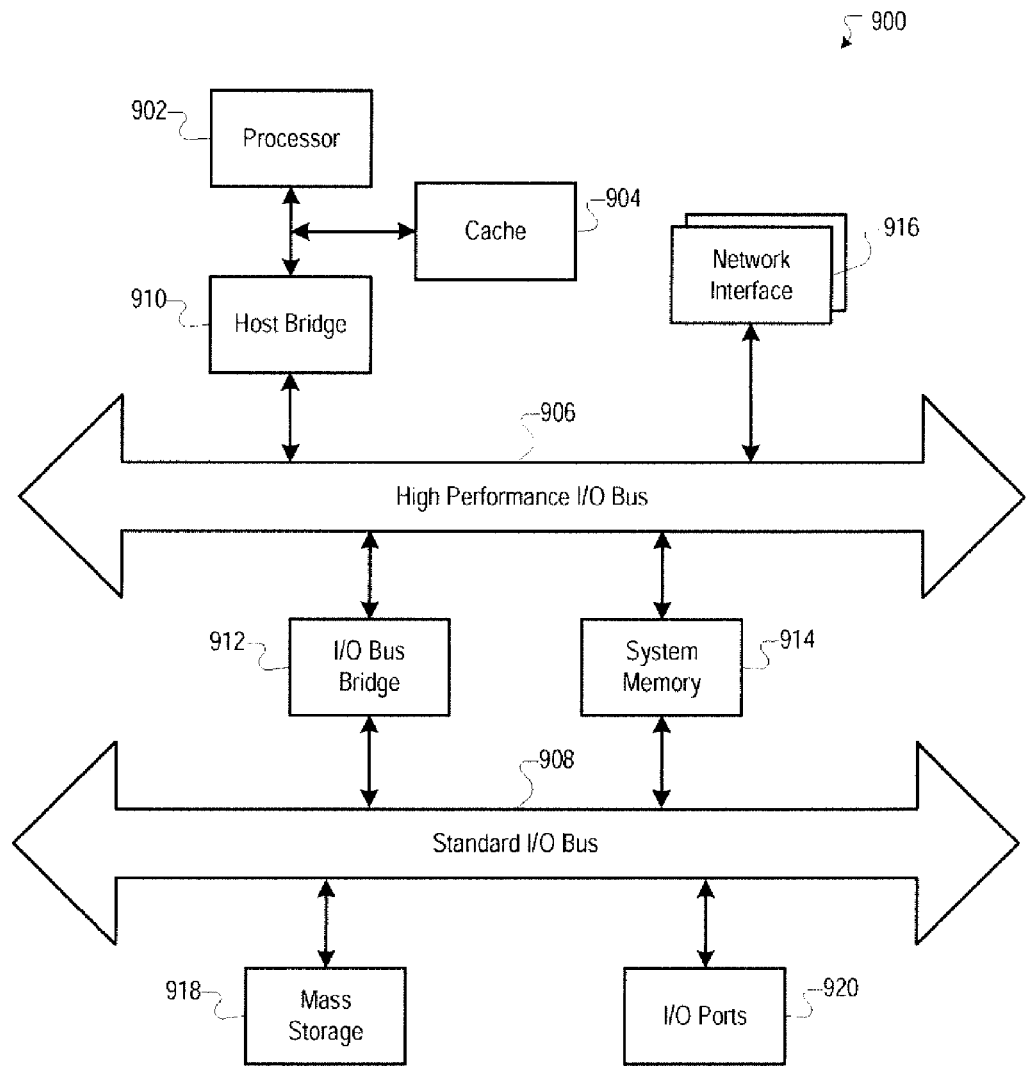
FIG. 9 illustrates an example of a computer system that may be used to implement one or more of the embodiments described herein.

The foregoing processes and features can be implemented by a wide variety of machine and computer system architectures and in a wide variety of network and computing environments. FIG. 9 illustrates an example of a computer system 900 that may be used to implement one or more of the embodiments described herein. The computer system 900 includes sets of instructions for causing the computer system 900 to perform the processes and features discussed herein. The computer system 900 may be connected (e.g., networked) to other machines. In a networked deployment, the computer system 900 may operate in the capacity of a server machine or a client machine in a client-server network environment, or as a peer machine in a peer-to-peer (or distributed) network environment. In an embodiment of the invention, the computer system 900 may be the social networking system 130, the user device 110, and the external system 120, or a component thereof. In an embodiment of the invention, the computer system 900 may be one server among many that constitutes all or part of the social networking system 130.

The computer system 900 includes a processor 902, a cache 904, and one or more executable modules and drivers, stored on a computer-readable medium, directed to the processes and features described herein. Additionally, the computer system 900 includes a high performance input/output (I/O) bus 906 and a standard I/O bus 908. A host bridge 910 couples processor 902 to high performance I/O bus 906, whereas I/O bus bridge 912 couples the two buses 906 and 908 to each other. A system memory 914 and one or more network interfaces 916 couple to high performance I/O bus 906. The computer system 900 may further include video memory and a display device coupled to the video memory (not shown). Mass storage 918 and I/O ports 920 couple to the standard I/O bus 908. The computer system 900 may optionally include a keyboard and pointing device, a display device, or other input/output devices (not shown) coupled to the standard I/O bus 908. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 900, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 900 are described in greater detail below. In particular, the network interface 916 provides communication between the computer system 900 and any of a wide range of networks, such as an Ethernet (e.g., IEEE 802.3) network, a backplane, etc. The mass storage 918 provides permanent storage for the data and programming instructions to perform the above-described processes and features implemented by the respective computing systems identified above, whereas the system memory 914 (e.g., DRAM) provides temporary storage for the data and programming instructions when executed by the processor 902. The I/O ports 920 may be one or more serial and/or parallel communication ports that provide communication between additional peripheral devices, which may be coupled to the computer system 900.

The computer system 900 may include a variety of system architectures, and various components of the computer system 900 may be rearranged. For example, the cache 904 may be on-chip with processor 902. Alternatively, the cache 904 and the processor 902 may be packed together as a "processor module", with processor 902 being referred to as the "processor core". Furthermore, certain embodiments of the invention may neither require nor include all of the above components. For example, peripheral devices coupled to the standard I/O bus 908 may couple to the high performance I/O bus 906. In addition, in some embodiments, only a single bus may exist, with the components of the computer system 900 being coupled to the single bus. Furthermore, the computer system 900 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 900 that, when read and executed by one or more processors, cause the computer system 900 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 900, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 902. Initially, the series of instructions may be stored on a storage device, such as the mass storage 918. However, the series of instructions can be stored on any suitable computer readable storage medium. Furthermore, the series of instructions need not be stored locally, and could be received from a remote storage device, such as a server on a network, via the network interface 916. The instructions are copied from the storage device, such as the mass storage 918, into the system memory 914 and then accessed and executed by the processor 902.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
receiving, from a user, a designation of one or more items of digital media;
receiving, from the user, a communication regarding the one or more items of digital media;
receiving, from the user, tag data regarding the communication or the one or more items of digital media, wherein the tag data identifies one or more entities, selected by the user, on a social networking system;
associating the one or more items of digital media, the communication, and the tag data, based on the designation; and
sharing the one or more items of digital media, the communication, and the tag data with users of the social networking system.

2. The computer implemented method of claim 1, wherein the identified entities comprise one or more users of the social networking system.

3. The computer implemented method of claim 1, wherein the identified entities are non-user entities comprising: content items, web pages, groups, activities, messages, or concepts.

4. The computer implemented method of claim 1, further comprising setting a privacy level of the communication and the one or more items of digital media.

5. The computer implemented method of claim 4, further comprising adjusting the privacy level for the communication and the one or more items of digital media based on the identified entities.

6. The computer implemented method of claim 1, wherein the digital media comprises digital images.

7. The computer implemented method of claim 1, wherein the digital media comprises: videos, illustrations, or documents.

8. The computer implemented method of claim 1, wherein the communication comprises textual content.

9. A non-transitory computer-readable storage media containing computer program code for:
receiving, from a user, a designation of one or more items of digital media;
receiving, from the user, a communication regarding the one or more items of digital media;
receiving, from the user, tag data regarding the communication or the one or more items of digital media, wherein the tag data identifies one or more entities, selected by the user, on a social networking system;
associating the one or more items of digital media, the communication, and the tag data, based on the designation; and
sharing the one or more items of digital media, the communication, and the tag data with users of the social networking system.

10. The media of claim 9, wherein the identified entities comprise one or more users of the social networking system.

11. The media of claim 9, wherein the identified entities are non-user entities comprising: content items, web pages, groups, activities, messages, or concepts.

12. The media of claim 9, further comprising setting a privacy level of the communication and the one or more items of digital media.

13. The media of claim 12, further comprising adjusting the privacy level for the communication and the one or more items of digital media based on the identified entities.

14. The media of claim 9, wherein the digital media comprises digital images.

15. The media of claim 9, wherein the digital media comprises: videos, illustrations, or documents.

16. The media of claim 9, wherein the communication comprises textual content.

17. A system comprising:
one or more processors; and
a non-transitory memory coupled to the processors comprising instructions executable by the processors, the processors operable when executing the instructions to:
receive, from a user, a designation of one or more items of digital media;
receive, from the user, a communication regarding the one or more items of digital media;
receive, from the user, tag data regarding the communication or the one or more items of digital media, wherein the tag data identifies one or more entities, selected by the user, on a social networking system;
associate the one or more items of digital media, the communication, and the tag data, based on the designation; and
share the one or more items of digital media, the communication, and the tag data with users of the social networking system.

18. The system of claim 17, wherein the identified entities comprise one or more users of the social networking system.

19. The system of claim 17, wherein the identified entities are non-user entities comprising: content items, web pages, groups, activities, messages, or concepts.

20. The system of claim 17, wherein the processors are further operable when executing the instructions to:
set a privacy level of the communication and the one or more items of digital media.

21. The system of claim 20, wherein the processors are further operable when executing the instructions to:
adjust the privacy level for the communication and the one or more items of digital media based on the identified entities.

22. The system of claim 17, wherein the digital media comprises digital images.

23. The system of claim 17, wherein the digital media comprises: videos, illustrations, or documents.

24. The system of claim 17, wherein the communication comprises textual content.

* * * * *